United States Patent
Kobayashi et al.

(10) Patent No.: US 8,018,520 B2
(45) Date of Patent: Sep. 13, 2011

(54) IMAGING DEVICE, IMAGING METHOD, DISPLAY CONTROL DEVICE, DISPLAY CONTROL METHOD, AND PROGRAM

(75) Inventors: Seiji Kobayashi, Tokyo (JP); Ryo Taki, Tokyo (JP)

(73) Assignee: Sony Corporation, Tokyo (JP)

( * ) Notice: Subject to any disclaimer, the term of this patent is extended or adjusted under 35 U.S.C. 154(b) by 439 days.

(21) Appl. No.: 12/246,054

(22) Filed: Oct. 6, 2008

(65) Prior Publication Data
US 2009/0109310 A1    Apr. 30, 2009

(30) Foreign Application Priority Data
Oct. 26, 2007    (JP) ................. P2007-279131

(51) Int. Cl.
*H04N 5/222*    (2006.01)
*H04N 5/232*    (2006.01)
(52) U.S. Cl. ............. 348/333.02; 348/346; 348/354
(58) Field of Classification Search ........... 348/333.02, 348/346, 354
See application file for complete search history.

(56) References Cited

U.S. PATENT DOCUMENTS
7,271,838 B2 *    9/2007    Suekane et al. .......... 348/333.02
7,324,151 B2 *    1/2008    Onozawa .................. 348/346
2005/0219403 A1 *    10/2005    Hyodo ..................... 348/349

FOREIGN PATENT DOCUMENTS
| JP | 3-11884 | 1/1991 |
| JP | 3-179976 | 8/1991 |
| JP | 11-4378 | 1/1999 |
| JP | 2000-350224 | 12/2000 |
| JP | 2001-309161 | 11/2001 |
| JP | 2005-242906 | 9/2005 |
| JP | 2006-108973 | 4/2006 |
| JP | 2007-60328 | 3/2007 |

OTHER PUBLICATIONS

Japanese Office Action in corresponding Japanese Patent Application 2007-279131 dated Sep. 24, 2009 (2 pages).

* cited by examiner

*Primary Examiner* — James Hannett
(74) *Attorney, Agent, or Firm* — Finnegan, Henderson, Farabow, Garrett & Dunner, L.L.P.

(57) ABSTRACT

An imaging device includes an image obtaining unit configured to capture an image of a subject to obtain video data; an extraction unit configured to extract high-frequency components in at least one of a horizontal direction and a vertical direction of the video data; a calculation unit configured to calculate a parameter based on the high-frequency components in the at least one of the horizontal direction and vertical direction extracted by the extraction unit, the parameter indicating a magnitude of a high-frequency component for every line or every group of lines in the at least one of the horizontal direction and vertical direction; and a combining unit configured to combine an indicator indicating a magnitude of the parameter with the video data at a predetermined position in the at least one of the horizontal direction and vertical direction.

13 Claims, 11 Drawing Sheets

IMAGING DEVICE, IMAGING METHOD, DISPLAY CONTROL DEVICE, DISPLAY CONTROL METHOD, AND PROGRAM

CROSS REFERENCES TO RELATED APPLICATIONS

The present invention contains subject matter related to Japanese Patent Application JP 2007-279131 filed in the Japanese Patent Office on Oct. 26, 2007, the entire contents of which are incorporated herein by reference.

BACKGROUND OF THE INVENTION

1. Field of the Invention

The present invention relates to an imaging device, an imaging method, a display control device, a display control method, and a program. More specifically, the present invention relates to an imaging device, an imaging method, a display control device, a display control method, and a program in which information for assisting a user in performing a focusing operation can be displayed.

2. Description of the Related Art

In video camera devices mainly for professional use, various types of auxiliary information are displayed on viewfinders mounted on the video camera devices to assist photographers in performing a focusing operation in a manual focus control mode.

For example, Japanese Unexamined Patent Application Publication No. 2000-350224 describes a peaking circuit configured to extract spatial high-frequency components at an edge of a captured image from the captured image to increase the number of edge components before combining the edge components with the captured image, and display the captured image with the edge components on a viewfinder so that the edge is enhanced in the focusing process.

Japanese Unexamined Patent Application Publication No. 3-11884 or 3-179976 discloses that technique results obtained by applying a high-pass filter to a specific area located in a center of a captured image are integrated and a one-dimensional parameter obtained as a result of the integration is displayed on a viewfinder to show the focus level.

In an image displayed with the use of the peaking circuit described in Japanese Unexamined Patent Application Publication No. 2000-350224, edges of subjects appearing in the image has been enhanced, which facilitates designation of an object to focus on and also facilitates easy focusing. In spite of such advantages, the use of a wide-angle lens or the like would increase the depth of field and decrease the size of a subject image on a screen. In the technique described in Japanese Unexamined Patent Application Publication No. 2000-350224, therefore, it is difficult to obtain an optimum focal position. In the technique described in Japanese Unexamined Patent Application Publication No. 2000-350224, furthermore, a subject image is merely displayed with the edge thereof enhanced, and would not allow a user to determine whether or not the current focal length value is optimum.

In a method of displaying auxiliary information described in Japanese Unexamined Patent Application Publication No. 3-11884 or 3-179976, on the other hand, an overlay showing a parameter indicating a magnitude of a high-frequency component in an image is displayed on a viewfinder as, for example, a bar indicator, which facilitates the determination of the amount by which the focus level increases or decreases in accordance with the movement of the focal length of a lens. In spite of such advantages, in the technique described in Japanese Unexamined Patent Application Publication No. 3-11884 or 3-179976, a parameter is set as a result of integration of all high-frequency components within a specific area on the screen. It is therefore difficult for a user to correctly recognize which subject within the area is in focus or it is difficult for a user to apply a high-pass filter to an area where a desired subject to focus on appears to calculate the parameter.

SUMMARY OF THE INVENTION

It is therefore desirable to allow a user to easily identify a subject that is in focus within a captured image or to easily determine a peak of a focus level of a desired subject.

According to an embodiment of the present invention, an imaging device includes an image obtaining unit configured to capture an image of a subject to obtain video data; an extraction unit configured to extract high-frequency components in at least one of a horizontal direction and a vertical direction of the video data; a calculation unit configured to calculate a parameter based on the high-frequency components in the at least one of the horizontal direction and vertical direction extracted by the extraction unit, the parameter indicating a magnitude of a high-frequency component for every line or every group of lines in the at least one of the horizontal direction and vertical direction; and a combining unit configured to combine an indicator indicating a magnitude of the parameter with the video data at a predetermined position in the at least one of the horizontal direction and vertical direction.

The imaging device may further include a storage unit configured to store a maximum value of previous parameter values for every line or every group of lines, the maximum value of previous parameter values being calculated for the parameter calculated for every line or every group of lines; and a comparison unit configured to output to the combining unit a parameter whose value is the greater of the maximum value stored in the storage unit and a value of a parameter calculated by the calculation unit for a corresponding line or group of lines, and, when the value of the parameter calculated by the calculation unit is greater than the maximum value stored in the storage unit, update the maximum value stored in the storage unit with the value of the parameter calculated by the calculation unit. The combining unit may combine a peak line with the video data, the peak line, indicating a maximum value of the parameter for every line or every group of lines.

The imaging device may further include a recording unit configured to record the video data.

The indicator may be a line-graph indicator.

The indicator may be a bar-graph indicator.

The extraction unit may extract high-frequency components in at least one of the horizontal direction and vertical direction using a luminance signal of the video data.

The extraction unit may extract high-frequency components in at least one of the horizontal direction and vertical direction using a signal of a color channel of the video data, the video data having color channels including red, green, and blue channels.

According to another embodiment of the present invention, an imaging method includes the steps of capturing an image of a subject to obtain video data; extracting high-frequency components in at least one of a horizontal direction and a vertical direction of the video data; calculating a parameter based on the high-frequency components in the at least one of the horizontal direction and vertical direction, the parameter indicating a magnitude of a high-frequency component for every line or every group of lines in the at least one of the horizontal direction and vertical direction; and combining an indicator indicating a magnitude of the parameter with the video data at a predetermined position in the at least one of the horizontal direction and vertical direction.

According to another embodiment of the present invention, a program causes a computer to execute an imaging method, the imaging method includes the steps of capturing an image of a subject to obtain video data; extracting high-frequency components in at least one of a horizontal direction and a vertical direction of the video data; calculating a parameter based on the high-frequency components in the at least one of the horizontal direction and vertical direction, the parameter indicating a magnitude of a high-frequency component for every line or every group of lines in the at least one of the horizontal direction and vertical direction; and combining an indicator indicating a magnitude of the parameter with the video data at a predetermined position in the at least one of the horizontal direction and vertical direction.

In an embodiment of the present invention, an image of a subject is captured to obtain video data; high-frequency components in at least one of a horizontal direction and a vertical direction of the video data are extracted; a parameter is calculated based on the extracted high-frequency component in the at least one of the horizontal direction and vertical direction, the parameter indicating a magnitude of a high-frequency component for every line or every group of lines in the at least one of the horizontal direction and vertical direction; and an indicator indicating a magnitude of the parameter is combined with the video data at a predetermined position in the at least one of the horizontal direction and vertical direction.

Therefore, an image can be captured. In particular, an indicator that assists a user in performing a focusing operation can be combined with the captured image and the image with the indicator can be displayed.

According to another embodiment of the present invention, a display control device includes an extraction unit configured to extract high-frequency components in at least one of a horizontal direction and a vertical direction of video data obtained by capturing an image; a calculation unit configured to calculate a parameter based on the high-frequency components in the at least one of the horizontal direction and vertical direction extracted by the extraction unit, the parameter indicating a magnitude of a high-frequency component for every line or every group of lines in the at least one of the horizontal direction and vertical direction; and a combining unit configured to combine an indicator indicating a magnitude of the parameter with the video data at a predetermined position in the at least one of the horizontal direction and vertical direction, wherein the output of the combining unit is supplied to a display unit.

The display control device may further include a storage unit configured to store a maximum value of previous parameter values for every line or every group of lines, the maximum value of previous parameter values being calculated for the parameter calculated for every line or every group of lines; and a comparison unit configured to output to the combining unit a parameter whose value is the greater of the maximum value stored in the storage unit and a value of a parameter calculated by the calculation unit for a corresponding line or group of lines, and, when the value of the parameter calculated by the calculation unit is greater than the maximum value stored in the storage unit, update the maximum value stored in the storage unit with the value of the parameter calculated by the calculation unit. The combining unit may combine a peak line with the video data, the peak line indicating a maximum value of the parameter calculated for every line or every group of lines.

According to another embodiment of the present invention, a display control method includes the steps of extracting high-frequency components in at least one of a horizontal direction and a vertical direction of video data obtained by capturing an image; calculating a parameter based on the extracted high-frequency components in the at least one of the horizontal direction and vertical direction, the parameter indicating a magnitude of a high-frequency component for every line or every group of lines in the at least one of the horizontal direction and vertical direction; and combining an indicator indicating a magnitude of the parameter with the video data at a predetermined position in the at least one of the horizontal direction and vertical direction, wherein the output of the step of combining is supplied to a display unit.

According to another embodiment of the present invention, a program causes a computer to execute a display control method, the display control method including the steps of extracting high-frequency components in at least one of a horizontal direction and a vertical direction of video data obtained by capturing an image; calculating a parameter based on the extracted high-frequency components in the at least one of the horizontal direction and vertical direction, the parameter indicating a magnitude of a high-frequency component for every line or every group of lines in the at least one of the horizontal direction and vertical direction; and combining an indicator indicating a magnitude of the parameter with the video data at a predetermined position in the at least one of the horizontal direction and vertical direction, wherein the output of the step of combining is supplied to a display unit.

In an embodiment of the present invention, high-frequency components in at least one of a horizontal direction and a vertical direction of video data obtained by capturing an image are extracted; a parameter is calculated based on the extracted high-frequency components in the at least one of the horizontal direction and vertical direction, the parameter indicating a magnitude of a high-frequency component for every line or every group of lines in the at least one of the horizontal direction and vertical direction; an indicator indicating a magnitude of the parameter is combined with the video data at a predetermined position in the at least one of the horizontal direction and vertical direction; and a result obtained by combining the indicator with the video data is supplied to a display unit.

Therefore, an image captured using an imaging device can be displayed. In particular, an indicator that assists a user in performing a focusing operation can be combined with the captured image and the image with the indicator can be displayed.

The term "network" refers to a mechanism in which at least two devices are connected and information can be transmitted from one of the devices to another. Devices that communicate with each other via a network may be independent devices or internal blocks constituting a single device.

The term "communication" means wireless communication or wired communication, or may be communication including wireless communication and wired communication, that is, communication in which wireless communication is performed for a given range and wired communication is performed for another range. Alternatively, communication in which communication from a first device to a second device is performed via wired communication and communication from the second device to the first device is performed via wireless communication may be used.

The imaging device may be an independent device or a block that performs an imaging process of an information processing apparatus or a recording/reproducing apparatus.

DESCRIPTION OF THE PREFERRED EMBODIMENTS

Embodiments of the present invention will be described hereinafter with reference to the drawings.

Figure 1:
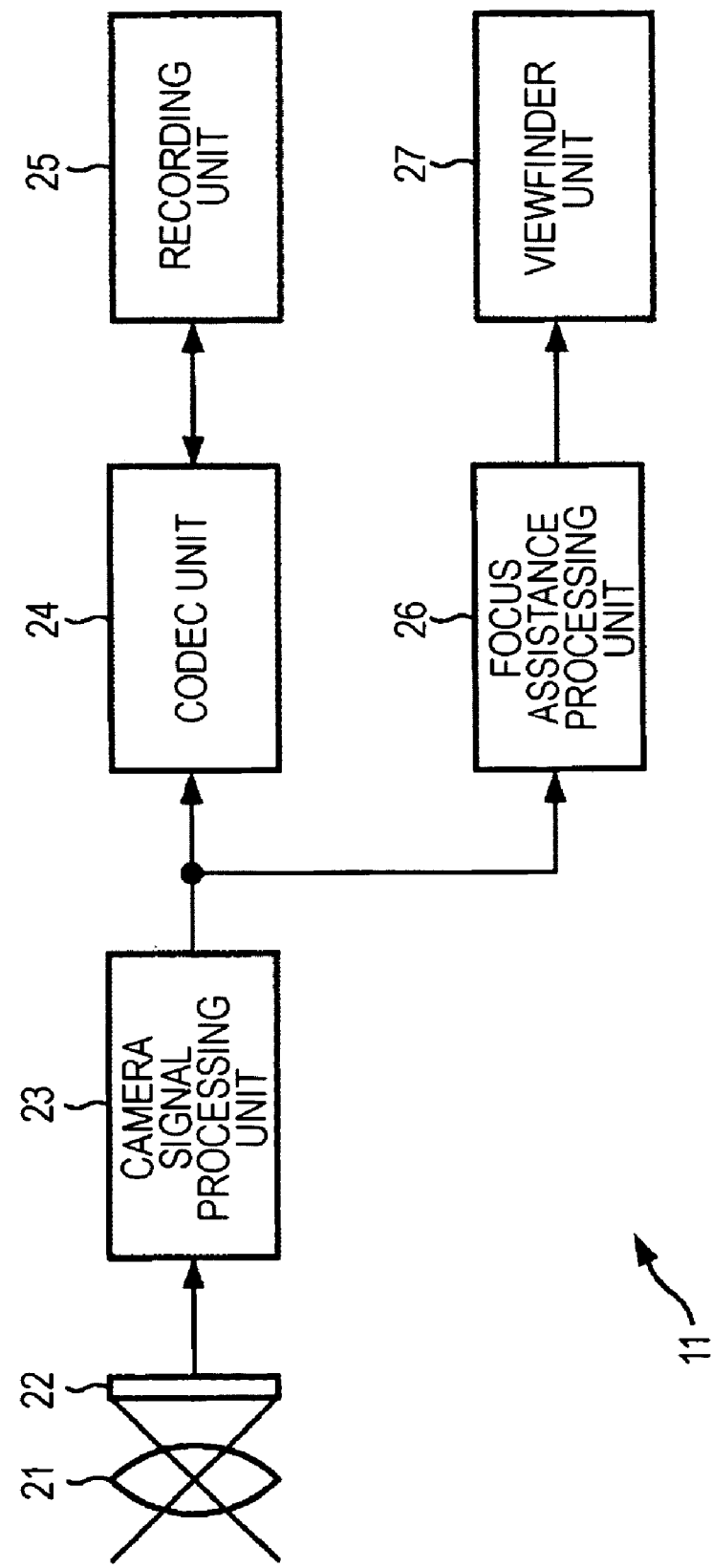
FIG. 1 is a block diagram showing a structure of an imaging device.

FIG. 1 is a block diagram showing an example structure of an imaging device 11. The imaging device 11 includes an imaging optical system 21, an imaging element 22, a camera signal processing unit 23, a codec unit 24, a recording unit 25, a focus assistance processing unit 26, and a viewfinder unit 27.

The imaging optical system 21 includes a lens and a mechanical shutter.

The imaging element 22 receives light entering through the imaging optical system 21. The imaging element 22 outputs imaging data that has been converted into digital data by an analog-to-digital (AD) converter (not shown). The AD converter may be mounted in the imaging element 22 particularly in a case where the imaging element 22 is a complementary metal oxide semiconductor (CMOS) solid-state imaging element, or may be disposed outside the imaging element 22 particularly in a case where the imaging element 22 is a solid-state imaging element other than a CMOS solid-state imaging element. In FIG. 1, the imaging element 22 of the imaging device 11 is a single-chip color solid-state imaging element having a light-receiving surface on which a color filter that allows light to pass through different wavelength ranges depending on pixels is mounted. Alternatively, the imaging device 11 may include an imaging system having a three-chip structure in which three different imaging elements receive light wavelength-separated by a prism optical system or the like.

The imaging data output from the imaging element 22 is so-called raw data. The raw data output from the imaging element 22 is supplied to the camera signal processing unit 23.

The camera signal processing unit 23 applies processing such as white balance correction processing, gain adjustment, demosaic processing, linear matrix processing, and gamma correction processing to the input raw data, and outputs resulting video data to the codec unit 24 and the focus assistance processing unit 26.

The codec unit 24 obtains the video data output from the camera signal processing unit 23, and compresses the data using a video signal encoding technique such as Moving Picture Experts Group-2 (MPEG-2), H.264, or Joint Photographic Experts Group 2000 (JPEG 2000) to generate an encoded stream. The codec unit 24 outputs the generated stream to the recording unit 25.

The recording unit 25 may be a recording medium such as an optical disk, a hard disk, or a semiconductor memory, and may be configured to have recorded thereon the encoded stream supplied from the codec unit 24. Alternatively, the recording unit 25 may be a drive in which a removable recording medium (such as an optical disk, a magneto-optical disk, or a semiconductor memory) is removable, and may be configured to record the encoded stream supplied from the codec unit 24 onto a removable recording medium placed therein.

The video data output from the camera signal processing unit 23 is also supplied to the focus assistance processing unit 26 so that the video data can be displayed on the viewfinder unit 27 for photographer's confirmation. The focus assistance processing unit 26 combines a focus indicator with the input video data. A focus indicator is auxiliary information for assisting a photographer in identifying the focus level. The focus assistance processing unit 26 supplies a video signal with the focus indicator combined therewith to the viewfinder unit 27 to control the display thereof. The details of the focus assistance processing unit 26 will be described later with reference to FIGS. 2 and 10.

The viewfinder unit 27 displays the video data having added thereto the focus indicator or auxiliary information for focusing, and presents the captured image and the auxiliary information for focusing to the photographer.

While in FIG. 1, the imaging device 11 includes the codec unit 24 and the recording unit 25, the imaging device 11 may not necessarily include those processing units and may be configured to output the video data output from the camera signal processing unit 23 directly to an external device, a network, or the like. In FIG. 1, the video data supplied to the codec unit 24 and the video data supplied to the focus assistance processing unit 26 are the same. Alternatively, video data resolution-converted according to the resolution of the viewfinder unit 27 may be supplied to the focus assistance processing unit 26.

While in FIG. 1, the imaging device 11 includes the viewfinder unit 27, the imaging device 11 may not necessarily include the viewfinder unit 27 and may be configured in such a manner that a captured image and auxiliary information for focusing can be output to an external display device connected thereto for display.

Alternatively, the imaging device 11 may include the imaging optical system 21, the imaging element 22, the camera signal processing unit 23, the codec unit 24, and the recording unit 25, and a different device may include the focus assistance processing unit 26 and the viewfinder unit 27. In this case, upon receiving video data that is the same as the video data supplied to the codec unit 24 or resolution-converted video data, the focus assistance processing unit 26 may combine a focus indicator, which is auxiliary information for assisting a photographer in identifying the focus level, with the received video data, and may supply the video signal with the focus indicator combined therewith to the viewfinder unit 27 to control the display thereof. Alternatively, the focus assistance processing unit 26 and the viewfinder unit 27 may be configured as individual devices. In this case, a display control device corresponding to the focus assistance processing unit 26 may be configured to upon receiving video data that is the same as the video data supplied to the codec unit 24 or resolution-converted video data, combine a focus indicator, which is auxiliary information for assisting a photographer in identifying the focus level, with the received video data, and supply the video signal with the focus indicator combined therewith to an external display device (not shown) (which is a display device corresponding to the viewfinder unit 27) to control the display thereof.

Figures 2, 3:
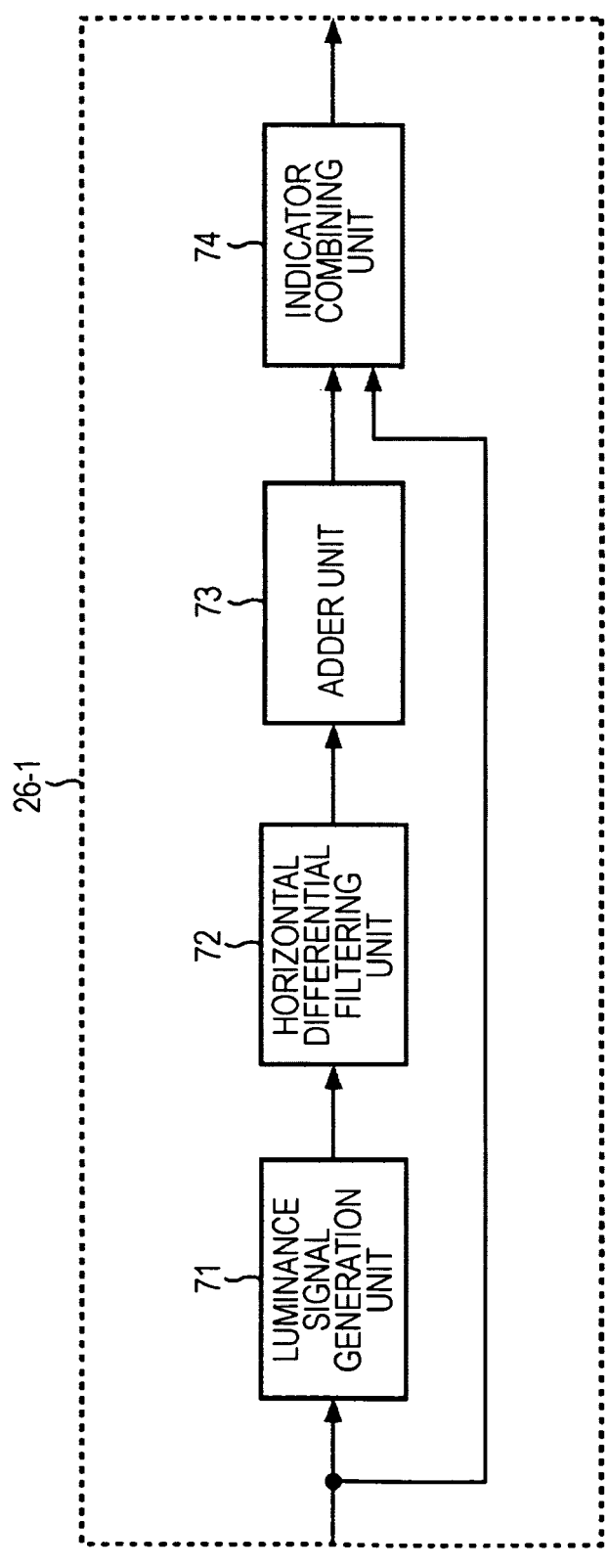
FIG. 2 is a block diagram showing a first example structure of a focus assistance processing unit shown in FIG. 1.
FIG. 3 is a diagram for illustrating a horizontal differential filter.

FIG. 2 is a block diagram showing a structure of a focus assistance processing unit 26-1, which is a first example of the focus assistance processing unit 26 shown in FIG. 1. The focus assistance processing unit 26-1 includes a luminance signal generation unit 71, a horizontal differential filtering unit 72, an adder unit 73, and an indicator combining unit 74.

The video data input to the focus assistance processing unit 26-1 is supplied to the luminance signal generation unit 71 and the indicator combining unit 74.

The luminance signal generation unit 71 performs a transformation process given by Equation (1) below on the input video data to generate a luminance signal Y:

$$Y=0.257R+0.504G+0.098B \quad (1)$$

where R represents a red (R) signal of the input video data, G represents a green (G) signal of the input video data, and B represents a blue (B) signal of the input video data.

The transformation process to be performed on the luminance signal Y is not limited to that given by Equation (1), and may be a process of, for example, simply adding the R signal, the G signal, and the B signal. While in FIG. 2, the luminance signal Y is generated, data in only one of the red, green, and blue channels of the input video data or data in all the channels may be subjected to the subsequent processing.

The horizontal differential filtering unit 72 obtains the luminance signal Y generated by the luminance signal generation unit 71, extracts a high-frequency component in the horizontal direction, and outputs the result to the adder unit 73. Specifically, for example, the horizontal differential filtering unit 72 applies a horizontal differential filter with a coefficient shown in FIG. 3 to the input luminance signal Y, and outputs resulting differential data to the adder unit 73. Since the differential filter shown in FIG. 3 serves to perform a differential process of the horizontal spatial direction on an image, the horizontal differential filtering unit 72 outputs a large value when an edge is present in the vertical direction. The horizontal differential filtering unit 72 may be configured to collectively perform processing for every several lines, instead of perform processing for every line, in the horizontal direction. Any shape of filter, other than the horizontal differential filter shown in FIG. 3, capable of extracting a high-frequency component in the horizontal direction may be used.

The adder unit 73 obtains the differential data output from the horizontal differential filtering unit 72, and calculates the sum of differential data for one horizontal line to output a differential sum value for each horizontal line to the indicator combining unit 74 as a parameter indicating a magnitude of a high-frequency component corresponding to that horizontal line. Alternatively, the adder unit 73 may be configured to collectively perform an addition operation on several horizontal lines instead of one horizontal line. Alternatively, for example, as described below with reference to FIG. 7, an area to be spatially focused on (focusing area) may be defined, and the adder unit 73 may calculate the sum of differential data only for horizontal lines in the focusing area among the horizontal lines.

The horizontal differential filtering unit 72 and the adder unit 73 may not necessarily extract a high-frequency component in the horizontal direction and perform linear addition, and may execute other processing if a parameter indicating a magnitude of a high-frequency component for one horizontal line can be determined. For example, a fast Fourier transform (FFT) may be applied to a predetermined area in an image to determine harmonic components.

The indicator combining unit 74 receives a parameter indicating a magnitude of a high-frequency component for each horizontal line, which is supplied from the adder unit 73, and generates a focus indicator based on magnitudes of the parameters for the individual lines. A focus indicator is auxiliary information serving as an index for assisting a user in adjusting the focal length to focus on a desired subject. The indicator combining unit 74 combines the generated focus indicator with the video data supplied from the camera signal processing unit 23, and outputs the result to the viewfinder unit 27 to control the display thereof.

The video data with which the indicator has been combined by the indicator combining unit 74 is displayed on the viewfinder unit 27.

An example of a focus indicator to be combined by the indicator combining unit 74 will be described with reference to FIGS. 4 to 9.

A first example of display of a focus indicator will be described with reference to FIGS. 4 and 5. In the example shown in FIGS. 4 and 5, the indicator combining unit 74 generates a line-graph focus indicator a indicating parameters for individual horizontal lines, and combines the focus indicator a with the video data so as to superimpose the focus indicator a on the video data. In the example shown in FIGS. 4 and 5, the closer to the right end of the screen a position of the line of the focus indicator a is, the smaller the parameter value of the corresponding horizontal line is, that is, the smaller the number of harmonic components the corresponding horizontal line has. A horizontal line corresponding to a peak of the line graph has a greater number of high-frequency areas. In the example shown in FIG. 4, the focus is on a woman in the center of the screen, and peaks of the focus indicator a appear in correspondence with horizontal lines where a face part in an image of the woman having a greater number of harmonic components is shown.

Figure 5:
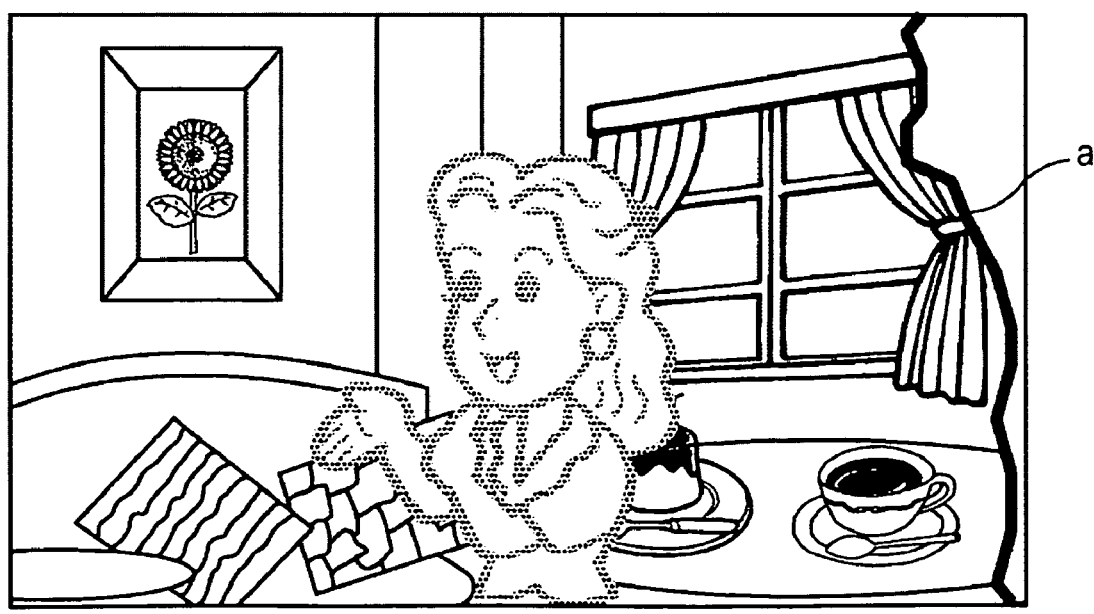
FIG. 5 is a diagram for illustrating the focus indicator.

In the example shown in FIG. 5, the focus is on a background. Peaks of the focus indicator a thus appear in a part corresponding to horizontal lines where a great number of background portions are shown instead of horizontal lines where the face part having a greater number of harmonic components in the image of the woman is shown. That is, the image of the woman is blurred and is out of focus.

When a moving image (or still image) is actually captured in a manual focus mode not an autofocus mode, a user sets the focus while viewing an image displayed on the viewfinder unit 27. FIGS. 4 and 5 show an image displayed on the viewfinder unit 27 at a moment while the user is changing the focal position in order to set the focus in the manual focus mode not the autofocus mode.

Since the spatial frequency of the foreground (in this example, the woman) or the background depends upon the subject, the level of peaks of the indicator a does not necessarily match the in-focus state. In actuality, when a lens is adjusted to change the focal position from the near side to the far side of the lens, the image and indicator displayed on the screen are changed from the state shown in FIG. 4 to the state shown in FIG. 5.

Specifically, with regard to lines where the face of the woman is shown, which is an area to be focused on, as the focal position is gradually moved from a position in front of the position of the woman to the far side, the level of the indicator a increases in the vicinity of the lines where the face of the woman is shown. In the state shown in FIG. 4, the indicator a peaks in the vicinity of the lines where the face of the woman is shown. In accordance with the transition to the state shown in FIG. 5, the level of the indicator a decreases. With regard to lines where the background is shown, on the other hand, the level of the indicator a is low in the corresponding portion in the state shown in FIG. 4. In accordance with the transition to the state shown in FIG. 5, the level of the indicator a increases. As the focal position of the lens is further moved to the far side, the level of the indicator a indicating the lines corresponding to the background portion reaches a maximum value in the state shown in FIG. 5, and then gradually decreases.

Such display of a focus indicator, which is auxiliary information serving as an index for adjusting the focal length, allows the user to easily recognize a change in the focus in accordance with a movement of the focal position of the lens. That is, the user can easily recognize whether or not a desired subject is in focus by viewing the indicator while moving the focal position of the lens in the near-far direction of the lens. Furthermore, even in a case where a motion picture of a moving subject on the screen is captured, the user can observe the focus indicator to easily recognize a temporal change in the spatial frequency on the screen. Therefore, the user can easily perform an operation in accordance with the motion of the subject, such as focus adjustment.

Figure 4:
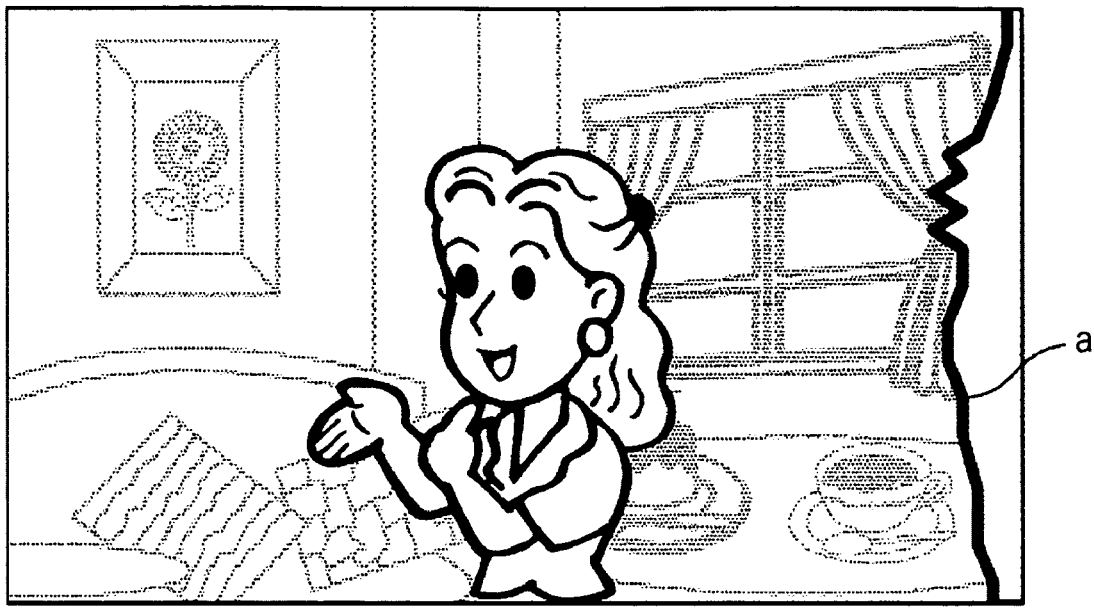
FIG. 4 is a diagram for illustrating a focus indicator.

In the example shown in FIGS. 4 and 5, the area between the margin and the line of a line graph is filled in with a desired color to facilitate more understanding of the line graph. Alternatively, only the line of the line graph may be displayed and the captured video data may be displayed as it is within the area between the margin and the line of the line graph so that the captured video data is not hidden in that area. Alternatively, the area between the margin and the line of the line graph may be shown with an appropriate transmittance and may be combined with a desired color for display. The display position of a line-graph focus indicator may be, but not limited to, the right end of the screen.

A second example of display of a focus indicator will be described with reference to FIG. 6. In the example shown in FIG. 6, the indicator combining unit 74 generates a bar-graph focus indicator a' indicating parameters for individual horizontal lines, and combines the focus indicator a' with the video data so as to superimpose the focus indicator a' on the video data. In the example shown in FIG. 6, bars of the bar graph are displayed at intervals of several lines. Alternatively, bars of the bar graph may be displayed in correspondence with all lines, or an average of parameter values for every group of lines may be determined and the averages may be shown in correspondence with the individual groups of lines. In the example shown in FIG. 6, the shorter a bar of the bar-graph focus indicator a' is, the smaller the parameter value is, that is, the smaller the number of harmonic components the corresponding horizontal line has. A horizontal line corresponding to the longest bar of the bar graph is a horizontal line having the greatest number of high-frequency areas. In the example shown in FIG. 6, the focus is on a woman in the center of the screen, and bars of the bar graph corresponding to horizontal lines where a face part in an image of the woman having a greater number of harmonic components is shown are long.

Figure 6:
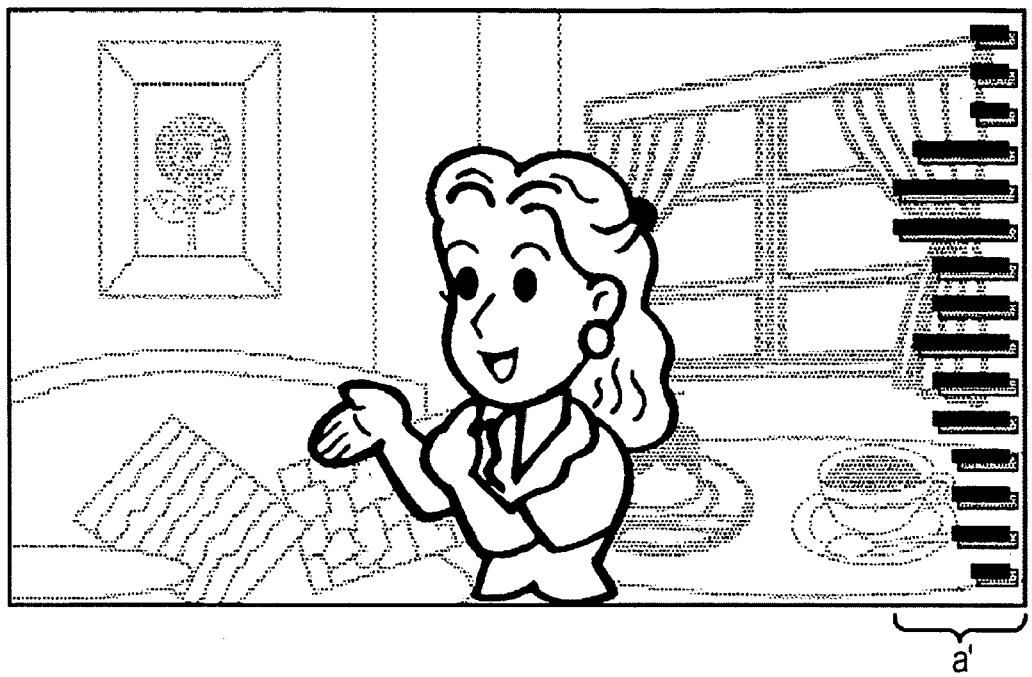
FIG. 6 is a diagram for illustrating another example of a focus indicator.

As shown in FIG. 6, even in a case where a bar-graph focus indicator is displayed, as in the example shown in FIGS. 4 and 5, the focus indicator indicates a temporal transition in the high-frequency component for each horizontal line within the video data to be displayed. Therefore, the user can observe the indicator while moving the focal position of the lens in the near-far direction of the lens to easily recognize a change in the focus in accordance with a movement of the focal position of the lens, thereby ensuring focus on a desired subject. Furthermore, even in a case where a motion picture of a moving subject on the screen is captured, the user can observe the focus indicator to easily recognize a temporal change in the spatial frequency within the screen. Therefore, the user can easily perform an operation in accordance with the motion of the subject, such as focus adjustment. The display position of a bar-graph focus indicator may be, but not limited to, the right end of the screen.

Further, an area to be focused on (focusing area) may be defined on the screen.

Figure 7:
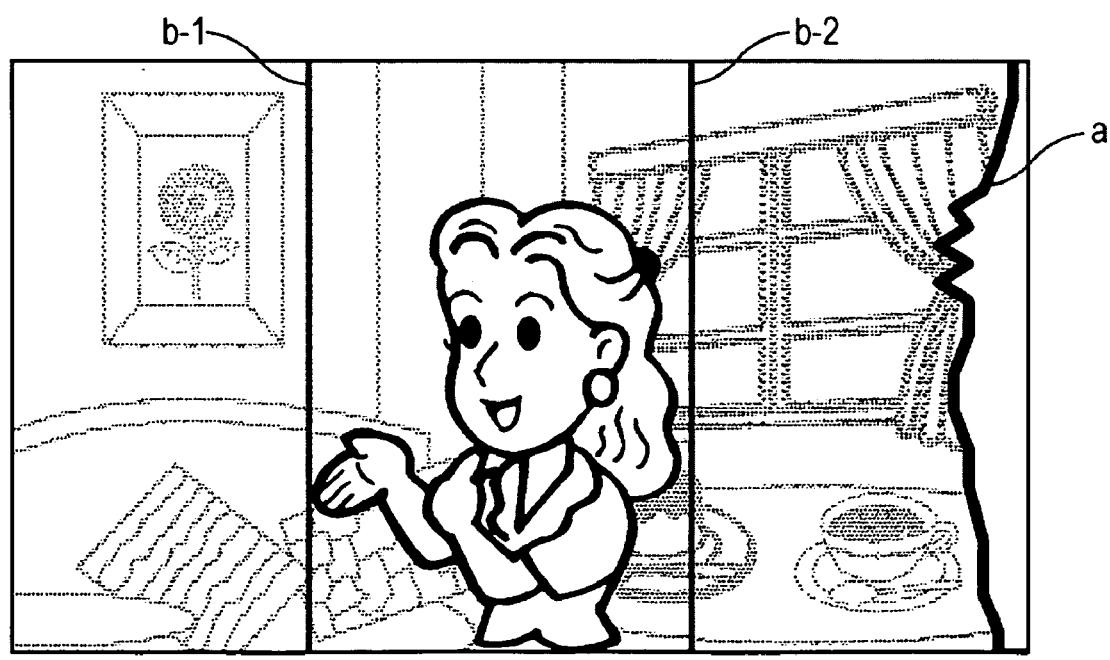
FIG. 7 is a diagram for illustrating a focusing area.

For example, as shown in FIG. 7, two vertical lines b-1 and b-2 are displayed on the screen and an area defined by the lines b-1 and b-2 is defined as a focusing area. The adder unit 73 performs an addition operation only on pixels within the area defined by the two lines b-1 and b-2 shown in FIG. 7. As a result, the display of a focus indicator is influenced only by the spatial frequency within the focusing area. Even in a high-complexity scene where a plurality of objects appear on one horizontal line, an focus indicator that assists in achieving more precise focusing can be displayed.

A focusing area may be freely set by a photographer or may be predetermined in the imaging device 11. A focusing area may be formed into a circular or polygonal shape on the screen, or a plurality of focusing areas may be formed on the screen.

Furthermore, a user may select whether or not a focusing area is defined.

In the foregoing description, in the focus assistance processing unit 26-1, upon obtaining a luminance signal generated by the luminance signal generation unit 71, the horizontal differential filtering unit 72 extracts a high-frequency component in the horizontal direction, and the adder unit 73 performs an addition operation on differential data for one horizontal line and determines a differential sum value for each horizontal line as a parameter indicating a magnitude of a high-frequency component corresponding to that horizontal line. For example, instead of the horizontal direction, harmonic components in the vertical direction may be extracted, and a parameter indicating a magnitude of a high-frequency component for one vertical line may be determined to generate an indicator indicating magnitudes of the parameters each indicating a magnitude of a high-frequency component for each vertical line. The indicator may be superimposed on the video data supplied from the camera signal processing unit 23, and the result may be output to and displayed on the viewfinder unit 27.

In order to display an indicator indicating magnitudes of parameters each indicating a magnitude of a high-frequency component for each vertical line, for example, the focus assistance processing unit 26-1 further includes an addition memory for one horizontal line, which is configured to store the result of addition operation on differential data of the vertical components. In place of the horizontal differential filtering unit 72, the focus assistance processing unit 26-1 includes a vertical differential filtering unit that performs a differential process of the vertical direction. In place of the adder unit 73, the focus assistance processing unit 26-1 includes an adder unit that executes a process of adding differential data output from the vertical differential filtering unit for each horizontal line to a value of the addition memory for corresponding one of the vertical lines. In place of the indicator combining unit 74, the focus assistance processing unit 26-1 includes an indicator combining unit that generates an indicator indicating magnitudes of parameters for the individual vertical lines, combines the indicator with the video data supplied from the camera signal processing unit 23, and outputs the result to the viewfinder unit 27.

A third example of display of a focus indicator will be described with reference to FIG. 8. In the third example, a line-graph indicator indicating magnitudes of parameters for individual vertical lines is displayed. In the example shown in FIG. 8, the indicator combining unit 74 superimposes a line-graph focus indicator c indicating parameters for the individual vertical lines on the video data. In this example, the closer to the bottom side of the screen a position of the line of the focus indicator c is, the smaller the value of the corresponding parameter is, that is, the smaller the number of harmonic components the corresponding vertical line has. A vertical line corresponding to a peak of the line graph has a greater number of high-frequency components. In the example shown in FIG. 8, the focus is on a woman in the center of the screen, and peaks of the focus indicator c appear in correspondence with vertical lines where an image of the woman is shown.

Figure 8:
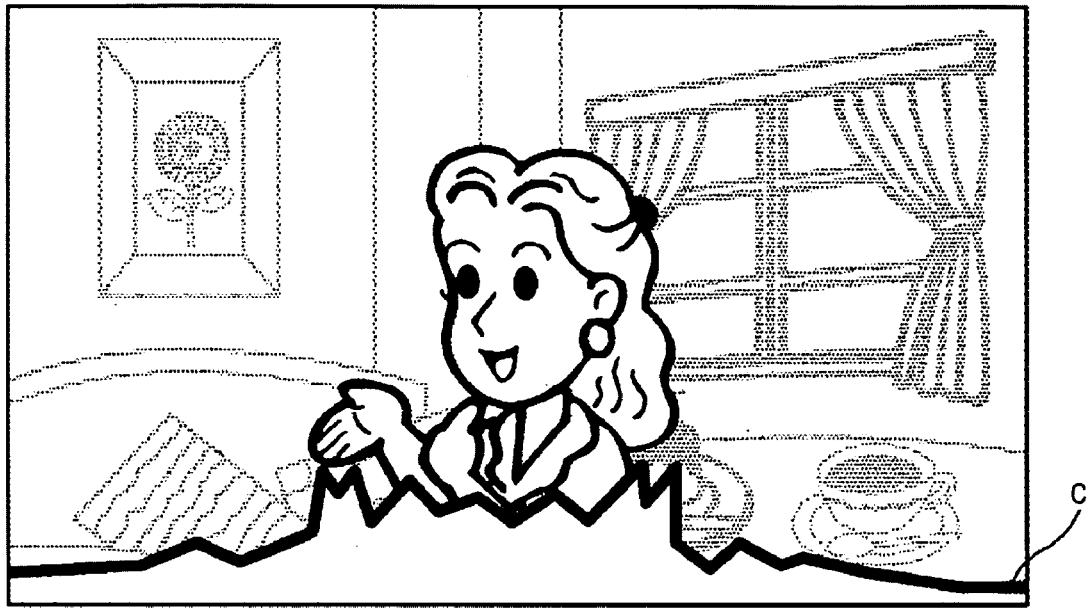
FIG. 8 is a diagram for illustrating still another example of a focus indicator.

Also in the example shown in FIG. 8, the focus indicator c indicates a temporal transition in the high-frequency components for the individual vertical lines within the video data displayed on the screen. Therefore, the user can observe the indicator while moving the focal position of the lens in the near-far direction of the lens to easily recognize a change in the focus in accordance with a movement of the focal position of the lens, thereby ensuring focus on a desired subject. Furthermore, even in a case where a motion picture of a moving subject on the screen is captured, the user can observe the focus indicator to easily recognize a temporal change in the spatial frequency on the screen. Therefore, the user can easily perform an operation in accordance with the motion of the subject, such as focus adjustment. The display position of a line-graph focus indicator may be, but not limited to, the bottom of the screen. Furthermore, a focus indicator representing high-frequency components in the vertical direction may be a line-graph focus indicator or a bar-graph focus indicator.

Figure 9:
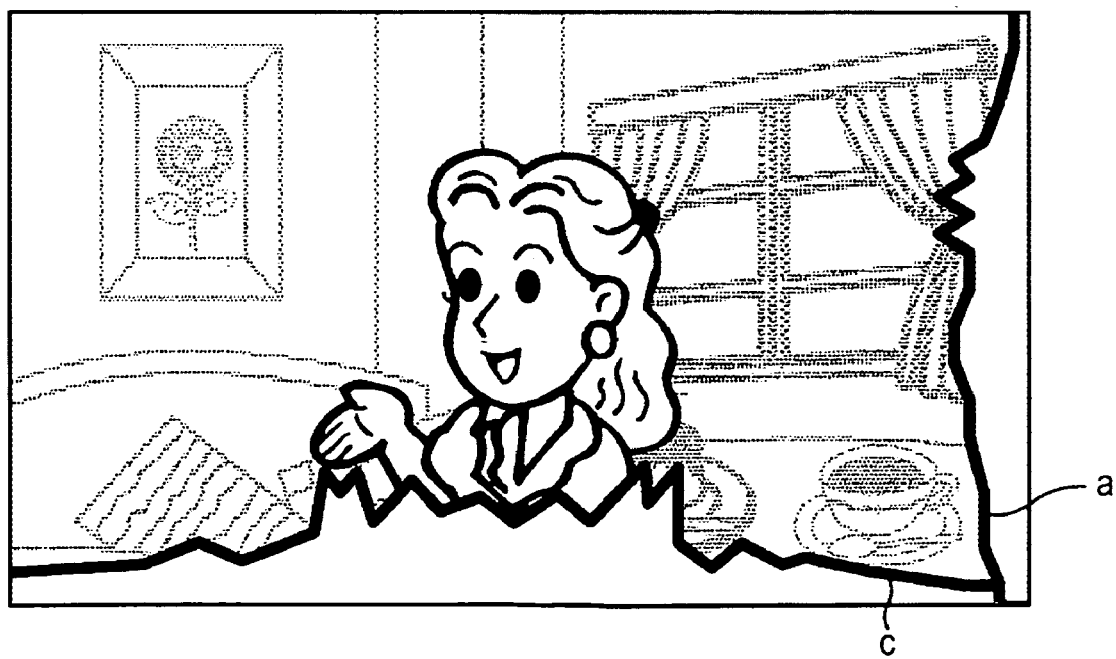
FIG. 9 is a diagram for illustrating still another example of a focus indicator.

As a fourth example of display of a focus indicator, as shown in FIG. 9, a focus indicator a indicating magnitudes of parameters for individual horizontal lines, and a focus indicator c indicating magnitudes of parameters for individual vertical lines may be superimposed on video data for display. In the example shown in FIG. 9, the indicator combining unit 74 combines the focus indicator a, which is a line-graph focus indicator indicating parameters for the individual horizontal lines, and the focus indicator c, which is a line-graph focus indicator indicating parameters for the individual vertical lines, with the video data so as to superimpose the focus indicators a and c on the video data.

While examples of display of a focus indicator have been described with reference to FIGS. 4 to 9, these examples are not intended to limit the functions of embodiments of the present invention. It is to be understood that any type of focus indicator may be displayed if the position of the focus indicator can be identified on an image space in accordance with the magnitude of a spatial high-frequency component of an image.

Figure 10:
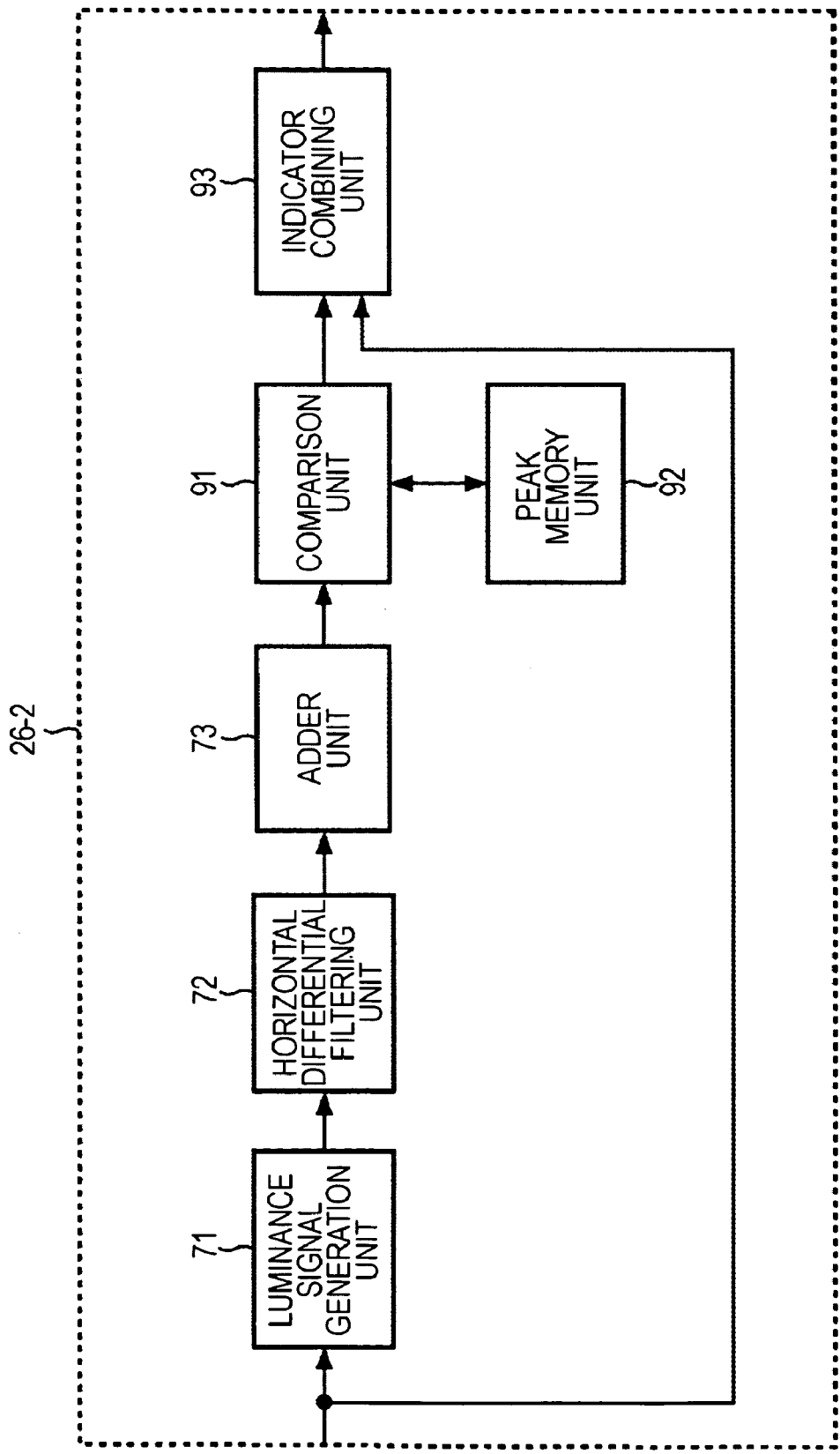
FIG. 10 is a block diagram showing a second example structure of the focus assistance processing unit shown in FIG. 1.

FIG. 10 is a block diagram showing a structure of a focus assistance processing unit 26-2, which is a second example of the focus assistance processing unit 26 shown in FIG. 1. In FIG. 10, units corresponding to those shown in FIG. 2 are assigned the same reference numerals, and a description thereof is appropriately omitted. The focus assistance processing unit 26-2 shown in FIG. 10 further includes a comparison unit 91 and a peak memory unit 92. In place of the indicator combining unit 74, the focus assistance processing unit 26-2 includes an indicator combining unit 93. Other structure of the focus assistance processing unit 26-2 is basically similar to that of the focus assistance processing unit 26-1 shown in FIG. 2.

The comparison unit 91 compares line-by-line differential sum values for individual horizontal lines, which are supplied from the adder unit 73, with maximum values of previous differential data for the individual horizontal lines, which are stored in advance in the peak memory unit 92. Then, the comparison unit 91 extracts, for each line, the greater of a maximum value of previous parameters and a value of a parameter determined with respect to the current frame, and outputs the extracted value as well as a differential sum value of each horizontal line, which is supplied from the adder unit 73, to the indicator combining unit 93. If the obtained parameters include a parameter having a greater value than that of previous parameters for corresponding one of the horizontal lines, the comparison unit 91 overwrites the information stored in the peak memory unit 92 with the greater differential sum value to update the maximum values of the previous differential data of the individual horizontal lines, which are stored in the peak memory unit 92.

The peak memory unit 92 is a memory that stores maximum values of differential sum values of the individual horizontal lines based on comparison results obtained by the comparison unit 91. A maximum value of previous differential data of each horizontal line, which is stored in the peak memory unit 92, is hereinafter also referred to as a "peak hold value".

The indicator combining unit 93 combines a focus indicator similar to that described above and a peak line indicating peak hold values with the video data, and outputs the result to the viewfinder unit 27 to control the display thereof.

Figure 11:
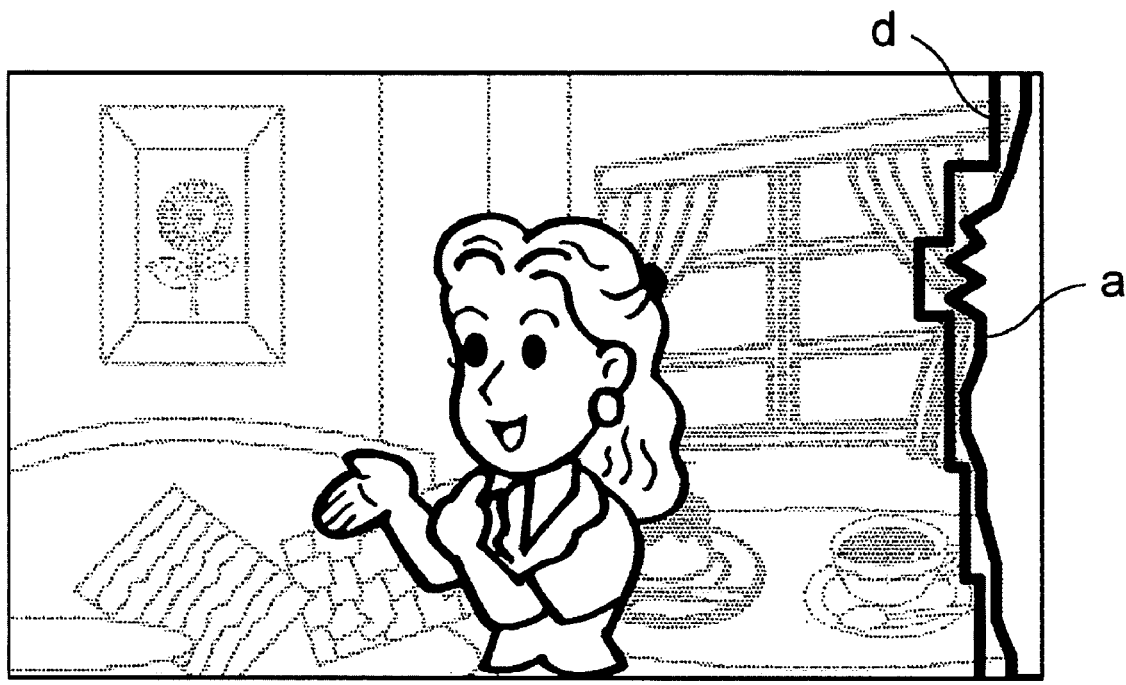
FIG. 11 is a diagram for illustrating a peak line indicating peak hold values.

FIG. 11 shows an example of an image displayed on the viewfinder unit 27 in a case where a focus indicator a indicating parameters for individual horizontal lines and a peak line d indicating peak hold values are generated by the indicator combining unit 93.

The focus indicator a indicating parameters for individual horizontal lines is the same as or similar to the focus indicator a described above with reference to FIGS. 4 and 5. While in the example shown in FIG. 11, a result of comparison collectively performed every several lines is shown, the comparison processing may be performed line-by-line. The peak line may be displayed using any method capable of showing previous maximum values.

If the harmonic components are high in each horizontal line, pixels on that horizontal line include a great number of edge elements. The user observes the indicator while moving the focal position of the lens in the near-far direction of the lens, and performs adjustment so that, on a line that is determined to have a peak of the indicator when a desired subject is in focus, the peak of the indicator matches a peak hold value, thereby easily setting focus on the desired subject.

Furthermore, in a case where an object to be imaged is changed, maximum values of previous differential sum values are no longer necessary. If the maximum values of differential sum values of the individual horizontal lines, which are recorded in the peak memory unit 92, are not reset for a certain period of time, the peak hold values become useless. Therefore, the maximum values of differential sum values of the individual horizontal lines, which are recorded in the peak memory unit 92, are reset for every predetermined period of time or are reset in response to an operation input from the user. In other words, the peak memory unit 92 stores maximum differential data which is effective until the next reset time.

Accordingly, as shown in FIG. 11, with the display of the peak line d corresponding to the peak hold values together with the focus indicator a, in a case where the user moves the focal position of the lens in the near-far direction of the lens to focus on a desired subject, the user determines whether or not a level of the indicator corresponding to an area to be focused on matches or is close to a peak to easily determine whether or not the current focal position is a focal position for achieving optimum focus on the desired subject. This method ensures that a desired subject can be in focus even in conditions where the depth of field is shallow and focusing is difficult.

The description with reference to FIGS. 10 and 11 has been given in the context of the process of only the horizontal direction. However, similarly to the example described with reference to FIG. 8, the process of the vertical direction may be performed, and a focus indicator and a peak line corresponding to peak hold values with regard to the vertical direction may be generated and displayed. Furthermore, similarly to the example described with reference to FIG. 9, the process of the horizontal direction and the process of the vertical direction may simultaneously be performed to two-dimensionally generate a focus indicator and a peak line corresponding to peak hold values, and the generated focus indicator and peak line may be displayed.

The description with reference to FIG. 1 has been given in the context of the imaging device 11 including the solid-state imaging element 22 and the camera signal processing unit 23, in which the focal length can be controlled according to an operation input from a user, and processes of the imaging device 11 have been described with reference to FIG. 2 and the subsequent figures. A single device may have both the function of the focus assistance processing unit 26 described with reference to FIG. 2 or 10 and the function of the viewfinder unit 27. Such a device may specifically be implemented by a display device having a function for obtaining from an external device an image captured using an imaging device whose focal length can be controlled according to an operation input from a user, creating a focus indicator as described above or the like, combining the focus indicator or the like with the image, and displaying the image with the focus indicator or the like combined therewith on a viewfinder.

Alternatively, a single device may have the function of the focus assistance processing unit 26 described with reference to FIG. 2 or 10. Such a device may specifically be implemented by a display control device having a function for obtaining from an external device an image captured using an imaging device whose focal length can be controlled according to an operation input from a user, creating a focus indicator as described above or the like, combining the focus indicator or the like with the image, and outputting the image with the focus indicator or the like combined therewith to another external display device for display.

Figure 12:
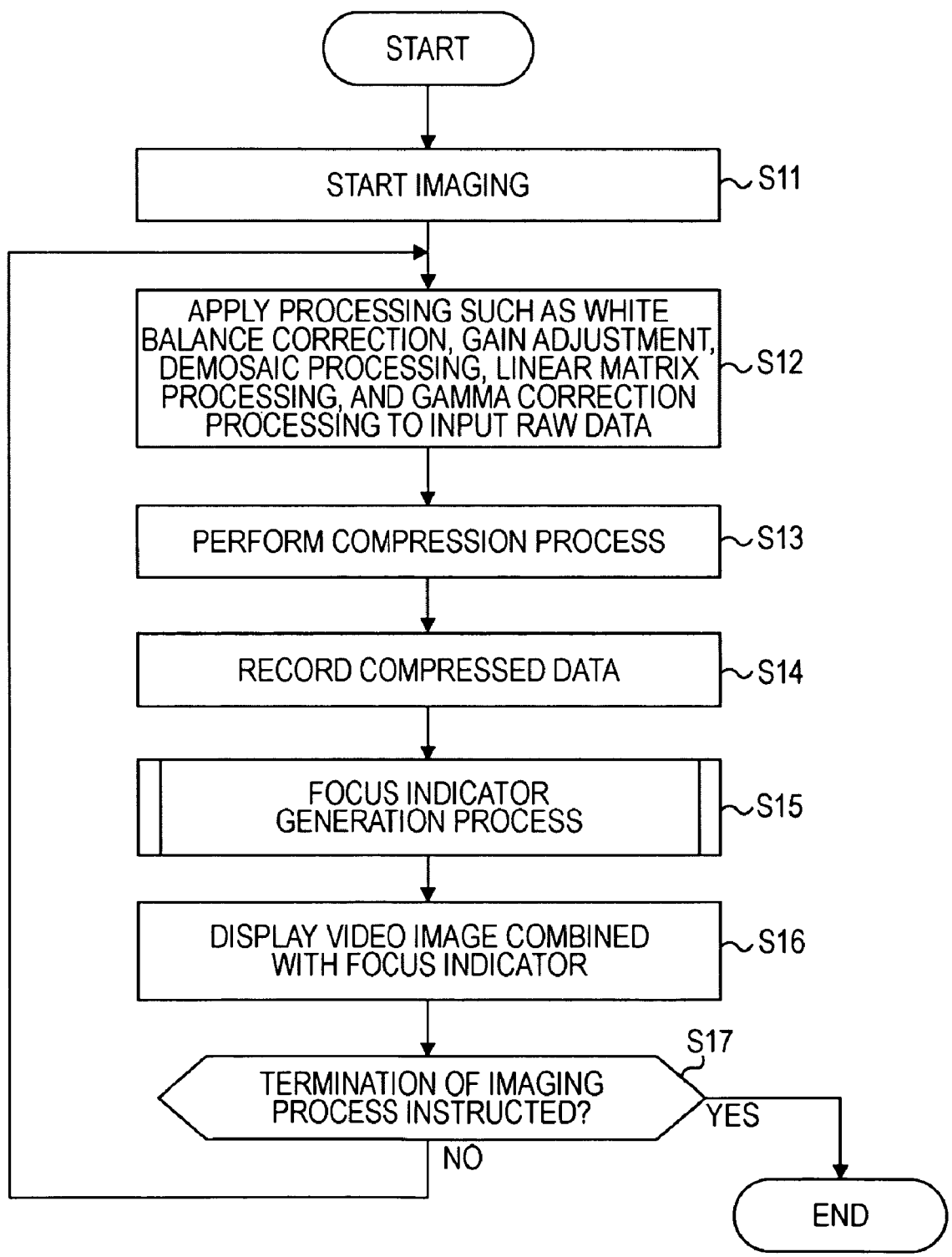
FIG. 12 is a flowchart for illustrating an imaging process.

Next, an imaging process executed by the imaging device 11 will be described with reference to a flowchart shown in FIG. 12. Although the processes of steps S13 and S14 and the processes of steps S15 and S16 may be executed in parallel for a certain frame of a captured moving image, the processes of steps S12 to S17 are basically executed in sequence according to the steps described herein. In the imaging device 11, however, those processes are executed in parallel because they are executed for an entire moving image composed of a plurality of sequentially captured frames.

In step S11, the imaging device 11 starts an imaging process in response to an operation input from a user through an operation input unit (not shown). The imaging element 22 receives light entering through the imaging optical system 21. The imaging element 22 outputs imaging data digitally converted by the AD converter (not shown) to the camera signal processing unit 23.

In step S12, the camera signal processing unit 23 applies processing such as white balance correction, gain adjustment, demosaic processing, linear matrix processing, and gamma correction processing to the input raw data, and outputs resulting video data to the codec unit 24 and the focus assistance processing unit 26.

In step S13, the codec unit 24 obtains the video data output from the camera signal processing unit 23, compresses the data using a video signal encoding technique such as MPEG-2, H.264, or JPEG 2000 to generate an encoded stream, and outputs the stream to the recording unit 25.

In step S14, the recording unit 25 records the compressed data supplied from the codec unit 24.

Figure 13:
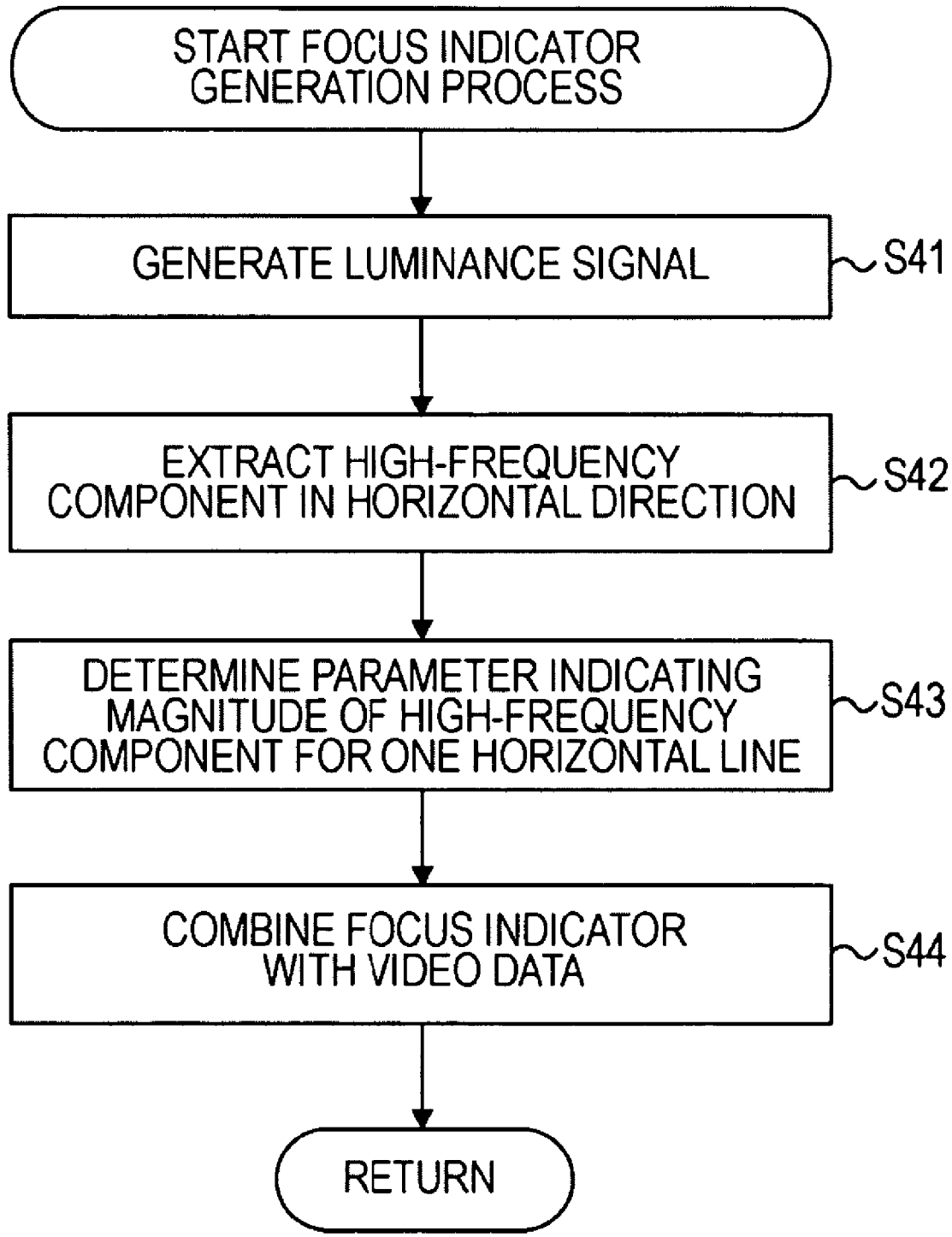
FIG. 13 is a flowchart for illustrating a first focus indicator generation process.
Figure 14:
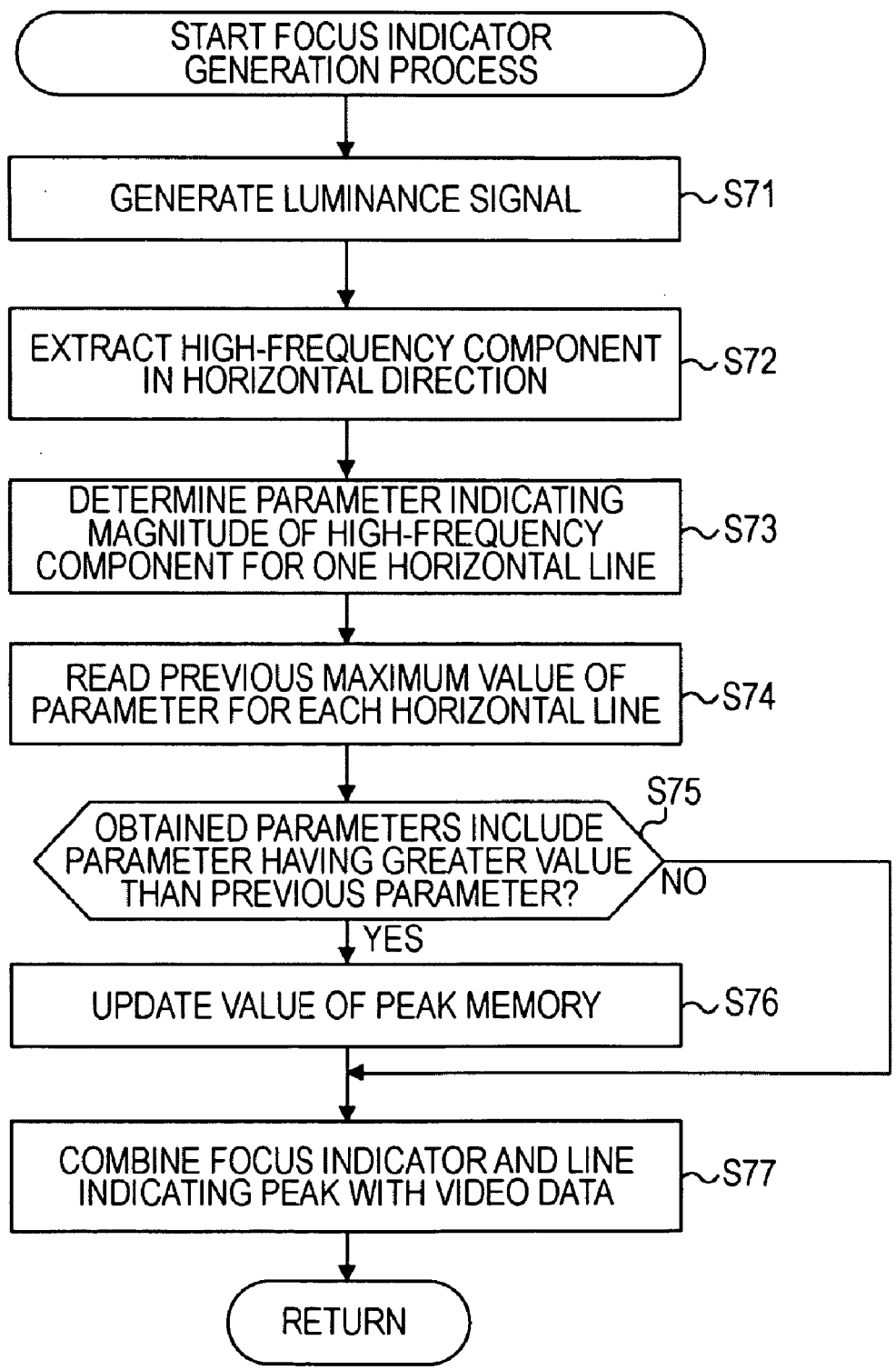
FIG. 14 is a flowchart for illustrating a second focus indicator generation process.

In step S15, a focus indicator generation process described below with reference to FIG. 13 or 14 is executed.

In step S16, the viewfinder unit 27 displays a video image with which a focus indicator serving as auxiliary information for assisting a photographer in identifying the focus level, or the focus indicator and a peak line indicating peak hold values have been combined, as described above with reference to FIGS. 4 to 9 or FIG. 11.

In step S17, it is determined whether or not the user has instructed to terminate the imaging process according to an operation input from the user through the operation input unit (not shown).

If it is determined in step S17 that the user has not instructed to terminate the imaging process, the process returns to step S12, and the subsequent processing is repeated.

If it is determined in step S17 that the user has instructed to terminate the imaging process, the process ends.

With the process described above, a moving image is captured and recorded, and, together with the recorded moving image, a focus indicator (or a focus indicator and a peak line indicating peak hold values) is displayed. The user can refer to the focus indicator to easily set focus on a desired object by, for example, operating a lens ring. It is to be understood that the lens may be electronically operated to automatically correct the focus.

Next, a first focus indicator generation process, which is a first example of the process executed in step S15 shown in FIG. 12, will be described with reference to a flowchart of FIG. 13. The first focus indicator generation process is executed by the focus assistance processing unit 26-1.

In step S41, the luminance signal generation unit 71 performs, for example, the transformation process given by Equation (1) described above on the input video data to generate a luminance signal Y.

In step S42, the horizontal differential filtering unit 72 receives the luminance signal Y generated by the luminance signal generation unit 71, applies a horizontal differential filter with the coefficient shown in FIG. 3 to the luminance signal Y to obtain differential data, and extracts a high-frequency component in the horizontal direction of the luminance signal Y.

In step S43, the adder unit 73 receives the differential data output from the horizontal differential filtering unit 72, and performs addition of differential data for one horizontal line to determine a parameter indicating a magnitude of a high-frequency component for one horizontal line.

In step S44, the indicator combining unit 74 receives the parameters indicating magnitudes of high-frequency components for individual horizontal lines, which are supplied from the adder unit 73, generates an indicator indicating magnitudes of the parameters for the individual lines, combines the indicator with the video data supplied from the camera signal processing unit 23 so as to superimpose the indicator on the video data, and outputs the result to the viewfinder unit 27 to control the display thereof. Then, the process returns to step S15 of FIG. 12, and proceeds to step S16.

With the process described above, for example, a focus indicator as described with reference to FIGS. 4 to 6 can be superimposed on the video data supplied from the camera signal processing unit 23, and the result can be displayed on the viewfinder unit 27.

Next, a second focus indicator generation process, which is a second example of the process executed in step S15 of FIG. 12, will be described with reference to a flowchart of FIG. 14. The second focus indicator generation process is executed by the focus assistance processing unit 26-2.

In steps S71 to S73, processing similar to that of steps S41 to S43 of FIG. 13 is executed. Specifically, the luminance signal generation unit 71 generates a luminance signal, the horizontal differential filtering unit 72 extracts a high-frequency component in the horizontal direction of the luminance signal, and the adder unit 73 determines a parameter indicating a magnitude of a high-frequency component for one horizontal line.

In step S74, the comparison unit 91 receives differential sum values of individual horizontal lines, which are supplied from the adder unit 73, and reads maximum values of previous parameters of the individual horizontal lines, which are stored in advance in the peak memory unit 92.

In step S75, the comparison unit 91 determines whether or not the parameters obtained by the adder unit 73 include a parameter having a greater value than the previous parameter of corresponding one of the horizontal lines, which is stored in advance in the peak memory unit 92.

If it is determined in step S75 that the obtained parameters include a parameter having a greater value than the previous parameter of corresponding one of the horizontal lines, then in step S76, the comparison unit 91 overwrites the information stored in the peak memory unit 92 with the greater differential sum value to update the maximum values of previous differential data of the individual horizontal lines, which are recorded in the peak memory unit 92.

If it is determined in step S75 that the obtained parameters do not include a parameter having a greater value than the previous parameters, or after the processing of step S76 has completed, in step S77, the indicator combining unit 93 generates a focus indicator indicating magnitudes of the parameters for the individual lines on the basis of the differential sum values of the individual horizontal lines, and also generates a peak line indicating peak hold values on the basis of the maximum values of previous differential data for the individual horizontal lines, which are recorded in the peak memory unit 92. Then, the indicator combining unit 93 combines the focus indicator and the peak line indicating the peak hold values with the video data supplied from the camera signal processing unit 23 so as to superimpose the focus indicator and the peak line on the video data, and outputs the result to the viewfinder unit 27 to control the display thereof. Then, the process returns to step S15 of FIG. 12, and proceeds to step S16.

With the process described above, for example, a focus indicator and a peak line indicating peak hold values, as described with reference to FIG. 11, can be superimposed on the video data supplied from the camera signal processing unit 23, and the result can be displayed on the viewfinder unit 27.

As described above, the maximum values of the parameters, which are recorded in the peak memory unit 92, may be reset after a certain period of time has elapsed or may be reset in response to an operation input from a user.

Further, in the process described with reference to the flowcharts shown in FIGS. 12 to 14, a parameter indicating a magnitude of a harmonic component is determined for each line in the horizontal direction, and an indicator is generated and displayed. Any other structure may be used. For example, as described above, a parameter indicating a magnitude of a harmonic component may be determined for every group of lines, and an indicator indicating the determined parameters may be displayed. Furthermore, as described with reference to FIG. 7, a focusing area may be set, and calculation may be performed using only harmonic components within the focusing area. Alternatively, as described with reference to FIGS. 8 and 9, parameters indicating magnitudes of harmonic components in the vertical direction instead of the horizontal direction may be determined, and an indicator associated with the parameters may be displayed.

In an embodiment of the present invention, therefore, a high-frequency component in at least one of horizontal and vertical directions of a captured image is extracted to detect a spatial frequency, and an indicator indicating the magnitude of the detected spatial frequency is generated and is displayed as an overlay on the captured image displayed on a viewfinder. This allows the user to easily and perform precise focusing in a manual focus control mode.

The series of processes described above may be executed by hardware or software. The software is installed from a recording medium onto a computer having a program constituting the software incorporated in dedicated hardware thereof or a device capable of executing various functions by installing therein various programs, such as a general-purpose personal computer. The processes described above are executed by, for example, a personal computer 500 shown in FIG. 15.

Figure 15:
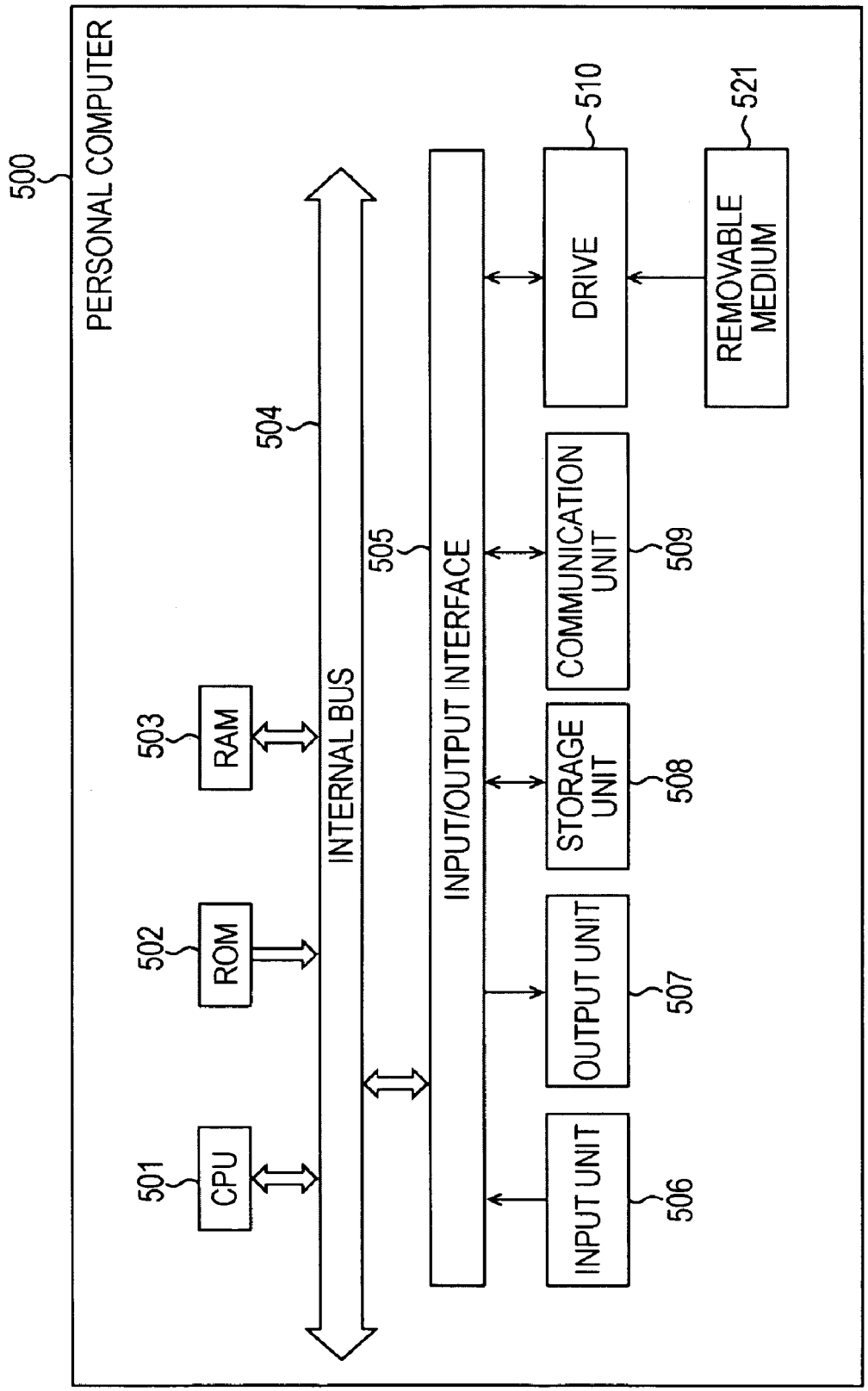
FIG. 15 is a block diagram showing a structure of a personal computer.

In FIG. 15, a central processing unit (CPU) 501 executes various processes according to a program stored in a read only memory (ROM) 502 or a program loaded from a storage unit 508 onto a random access memory (RAM) 503. The RAM 503 also stores data necessary for the CPU 501 to execute various processes and other suitable data as necessary.

The CPU 501, the ROM 502, and the RAM 503 are connected to one another via an internal bus 504. An input/output interface 505 is also connected to the internal bus 504.

The input/output interface 505 is connected to an input unit 506 including a keyboard and a mouse, an output unit 507 including a display such as a cathode ray tube (CRT) display or a liquid crystal display (LCD) and speakers, the storage unit 508, such as a hard disk, and a communication unit 509 including a modem, a terminal adapter, and other suitable devices. The communication unit 509 performs a communication process via various networks including a telephone line and a cable television (CATV) network.

The input/output interface 505 is also connected to a drive 510 as necessary, to which a removable medium 521 such as a magnetic disk, an optical disk, a magneto-optical disk, or a semiconductor memory is attached as necessary. A computer program read from the removable medium 521 is installed onto the storage unit 508 as necessary.

In a case where the series of processes is executed by software, a program constituting the software is installed from a network or a recording medium.

The recording medium may be, as shown in FIG. 15, formed of packaged media including the removable medium 521 having the program recorded thereon, which is distributed separately from the computer 500 to provide a user with the program, or may also be formed of the ROM 502, a hard disk including the storage unit 508, or any other suitable device having the program recorded thereon, which is provided to a user in a manner being pre-installed in the main body of the computer 500.

In this specification, steps defining a program recorded on a recording medium may include processes that are executed sequentially in the order described herein, and also include processes that are executed in parallel or individually, not necessarily sequentially.

The term "system", as used herein, refers to an entire device composed of a plurality of devices.

Embodiments of the present invention are not limited to the embodiment described above, and a variety of modifications may be made without departing from the scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
    an image obtaining unit configured to capture an image of a subject to obtain video data;
    an extraction unit configured to extract high-frequency components in at least one of a horizontal direction and a vertical direction of the video data;
    a calculation unit configured to calculate a parameter based on the high-frequency components in the at least one of the horizontal direction and vertical direction extracted by the extraction unit, the parameter indicating a magnitude of a high-frequency component for every line or every group of lines in the at least one of the horizontal direction and vertical direction;
    a combining unit configured to combine an indicator indicating a magnitude of the parameter with the video data at a predetermined position in the at least one of the horizontal direction and vertical direction;
    a storage unit configured to store a maximum value of previous parameter values for every line or every group of lines, the maximum value of previous parameter values being calculated for the parameter calculated for every line or every group of lines; and
    a comparison unit configured to output to the combining unit a parameter whose value is the greater of the maximum value stored in the storage unit and a value of a parameter calculated by the calculation unit for a corresponding line or group of lines, and, when the value of the parameter calculated by the calculation unit is greater than the maximum value stored in the storage unit, update the maximum value stored in the storage unit with the value of the parameter calculated by the calculation unit.

2. The imaging device according to claim 1, wherein the combining unit combines a peak line with the video data, the peak line indicating a maximum value of the parameter calculated for every line or every group of lines.

3. The imaging device according to claim 1, further comprising a recording unit configured to record the video data.

4. The imaging device according to claim 1, wherein the indicator is a line-graph indicator.

5. The imaging device according to claim 1, wherein the indicator is a bar-graph indicator.

6. The imaging device according to claim 1, wherein the extraction unit extracts high-frequency components in at least one of the horizontal direction and vertical direction using a luminance signal of the video data.

7. The imaging device according to claim 1, wherein the extraction unit extracts high-frequency components in at least one of the horizontal direction and vertical direction using a signal of a color channel of the video data, the video data having color channels including red, green, and blue channels.

8. An imaging method comprising the steps of:
    capturing an image of a subject to obtain video data;
    extracting high-frequency components in at least one of a horizontal direction and a vertical direction of the video data;
    calculating a parameter based on the high-frequency components in the at least one of the horizontal direction and vertical direction, the parameter indicating a magnitude of a high-frequency component for every line or every group of lines in the at least one of the horizontal direction and vertical direction;
    combining an indicator indicating a magnitude of the parameter with the video data at a predetermined position in the at least one of the horizontal direction and vertical direction;
    storing a maximum value of previous parameter values for every line or every group of lines, the maximum value of previous parameter values being calculated for the parameter calculated for every line or every group of lines; and
    outputting to the combining unit a parameter whose value is the greater of the maximum value stored in the storage unit and a value of a parameter calculated by the calculation unit for a corresponding line or group of lines, and, when the value of the parameter calculated by the calculation unit is greater than the maximum value stored in the storage unit, update the maximum value stored in the storage unit with the value of the parameter calculated by the calculation unit.

9. A computer program comprising programming instructions stored in a non-transitory computer readable medium, wherein the computer program, when executed on a computer controls the computer to execute an imaging method, the imaging method comprising the steps of:
    capturing an image of a subject to obtain video data;
    extracting high-frequency components in at least one of a horizontal direction and a vertical direction of the video data;
    calculating a parameter based on the high-frequency components in the at least one of the horizontal direction and vertical direction, the parameter indicating a magnitude of a high-frequency component for every line or every group of lines in the at least one of the horizontal direction and vertical direction;

combining an indicator indicating a magnitude of the parameter with the video data at a predetermined position in the at least one of the horizontal direction and vertical direction;

storing a maximum value of previous parameter values for every line or every group of lines, the maximum value of previous parameter values being calculated for the parameter calculated for every line or every group of lines; and outputting to the combining unit a parameter whose value is the greater of the maximum value stored in the storage unit and a value of a parameter calculated by the calculation unit for a corresponding line or group of lines, and, when the value of the parameter calculated by the calculation unit is greater than the maximum value stored in the storage unit, update the maximum value stored in the storage unit with the value of the parameter calculated by the calculation unit.

10. A display control device comprising:

an extraction unit configured to extract high-frequency components in at least one of a horizontal direction and a vertical direction of video data obtained by capturing an image;

a calculation unit configured to calculate a parameter based on the high-frequency components in the at least one of the horizontal direction and vertical direction extracted by the extraction unit! the parameter indicating a magnitude of a high-frequency component for every line or every group of lines in the at least one of the horizontal direction and vertical direction;

a combining unit configured to combine an indicator indicating a magnitude of the parameter with the video data at a predetermined position in the at least one of the horizontal direction and vertical direction;

a storage unit configured to store a maximum value of previous parameter values for every line or every group of lines, the maximum value of previous parameter values being calculated for the parameter calculated for every line or every group of lines; and a comparison unit configured to output to the combining unit a parameter whose value is the greater of the maximum value stored in the storage unit and a value of a parameter calculated by the calculation unit for a corresponding line or group of lines, and, when the value of the parameter calculated by the calculation unit is greater than the maximum value stored in the storage unit, update the maximum value stored in the storage unit with the value of the parameter calculated by the calculation unit, wherein the output of the combining unit is supplied to a display unit.

11. The display control device according to claim 10, wherein the combining unit combines a peak line with the video data, the peak line indicating a maximum value of the parameter calculated for every line or every group of lines.

12. A display control method comprising the steps of:

extracting high-frequency components in at least one of a horizontal direction and a vertical direction of video data obtained by capturing an image;

calculating a parameter based on the extracted high-frequency components in the at least one of the horizontal direction and vertical direction, the parameter indicating a magnitude of a high-frequency component for every line or every group of lines in the at least one of the horizontal direction and vertical direction;

combining an indicator indicating a magnitude of the parameter with the video data at a predetermined position in the at least one of the horizontal direction and vertical direction;

storing a maximum value of previous parameter values for every line or every group of lines, the maximum value of previous parameter values being calculated for the parameter calculated for every line or every group of lines; and outputting to the combining unit a parameter whose value is the greater of the maximum value stored in the storage unit and a value of a parameter calculated by the calculation unit for a corresponding line or group of lines, and, when the value of the parameter calculated by the calculation unit is greater than the maximum value stored in the storage unit, update the maximum value stored in the storage unit with the value of the parameter calculated by the calculation unit, wherein the output of the step of combining is supplied to a display unit.

13. A computer program comprising programming instructions stored in a non-transitory computer readable medium, wherein the computer program, when executed on a computer controls the computer to execute a display control method, the display control method comprising the steps of:

extracting high-frequency components in at least one of a horizontal direction and a vertical direction of video data obtained by capturing an image;

calculating a parameter based on the extracted high-frequency components in the at least one of the horizontal direction and vertical direction, the parameter indicating a magnitude of a high-frequency component for every line or every group of lines in the at least one of the horizontal direction and vertical direction;

combining an indicator indicating a magnitude of the parameter with the video data at a predetermined position in the at least one of the horizontal direction and vertical direction;

storing a maximum value of previous parameter values for every line or every group of lines, the maximum value of previous parameter values being calculated for the parameter calculated for every line or every group of lines; and outputting to the combining unit a parameter whose value is the greater of the maximum value stored in the storage unit and a value of a parameter calculated by the calculation unit for a corresponding line or group of lines, and, when the value of the parameter calculated by the calculation unit is greater than the maximum value stored in the storage unit, update the maximum value stored in the storage unit with the value of the parameter calculated by the calculation unit, wherein the output of the step of combining is supplied to a display unit.

* * * * *